Patented Dec. 2, 1952

2,620,273

UNITED STATES PATENT OFFICE 2,620,273

LIGHT-SENSITIVE PHOTOGRAPHIC ELEMENT

Jacob Joseph Jennen, Antwerp, Belgium, assignor to Gevaert Photo-Producten N. V., Antwerp, Belgium, a company of Belgium No Drawing. Application May 13, 1947, Serial No. 747,845. In Germany July 23, 1943

Section 1, Public Law 690, August 8, 1946
Patent expires July 23, 1963

11 Claims. (Cl. 95—8)

This invention relates to colored photographic layers, especially filter and anti-halation layers having no binding agent, and to a process for manufacturing the same.

Anti-halation layers have to meet the following requirements: their absorptive power should be adapted to the optical sensitivity of the silver halide emulsions; they should lose color quickly, completely and irreversibly in weak alkaline developing baths; and their decomposition products should exert no influence on the development or on the photographic properties of the emulsion. The layers should also withstand mechanical influences which remove the dyestuff itself or which could damage the thin layer.

The known anti-halation layers meet only one of the above listed requirements, that is to say, it is known to use irreversibly discoloring anti-halation layers characterised by the presence of condensation products of substituted aromatic aldehydes with quaternary heterocyclic bases containing a reactive methyl group. Condensation products of equimolar quantities of aromatic or cyclic aldehydes with cyclic combinations containing a reactive methylene group, or condensation products of dehydracetic acid with aromatic aldehydes and ketones, respectively, have also been used for the same purpose.

In order to obtain the desired resistance of the layers, the use of synthetic resins as binding agents for the dyestuff, or the varnishing of the layer with natural or synthetic resins containing at least one salt-forming hydroxyl or carboxyl group and being soluble in alkaline baths, has been proposed.

It is among the objects of my invention to generally improve colored photographic layers, particularly to provide filter and anti-halation layers having several of the above mentioned properties simultaneously.

A further object of my present invention is to provide a photographic light-sensitive single or multi-layer silver halide material containing at least one of the said colored photographic layers.

One method of accomplishing the foregoing objects is disclosed in the co-pending application of René Adriaan Stevens, Laurent Aloys Van Der Auwera and Désiré Maria Aloysius Van Goethem, Serial No. 741,684, filed April 15, 1947.

That method comprises the use of reaction products of organic acids containing at least one COOH or OH group suitable for salt formation and of basic azomethine dyestuffs of the type that are obtainable, e. g., by condensation of substituted or unsubstituted, aromatic or heterocyclic aldehydes with suitably substituted anilines or amines.

Said basic azomethine dyestuffs correspond to the following general formula:

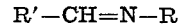

wherein R' is an aromatic or heterocyclic radical and R is an aromatic radical.

In accordance with the above identified co-pending application, intensely colored dyestuffs are obtained which discolor irreversibly in a weak alkaline medium and form lacquers without the use of a binding agent. Generally speaking, the anti-halation layers produced with those dyestuffs meet the different requirements above referred to.

Further and more specific objects of the present invention are to provide new colored photographic layers.

To accomplish the foregoing objects and others which will hereinafter appear, my invention resides in the product and the method of producing same, as are more particularly described in the following specification and sought to be defined in the appended claims.

According to my present invention, I produce colored photographic layers by using salts of organic acids containing at least one salt-forming COOH or OH group and of basic dyestuffs which contain a =C=N— group forming part of a heterocyclic ring and which correspond to the following general formula:

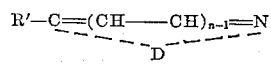

wherein D is the atom group required to complete a 5- or 6-membered ring usable in cyanine chemistry, $n$ is 1 or 2, and R' is an aromatic or a heterocyclic radical, especially a polarizable group as, e. g., phenyl, styryl, azobenzene, preferably bearing auxochromes as a hydroxyl or dialkylamino group.

Thus, the carbon of the =C=N— group is rendered more positive, the light absorption of the compound being shifted towards the long wave lengths.

Dyestuffs, in which R' is phenyl, are produced from alpha-phenylquinoline derivatives, alpha-phenylindole, dehydrothiotoluidine, etc.

Dyestuffs, in which R' is a styryl group, may be manufactured by condensation of aromatic or heterocyclic aldehydes with heterocyclic bases containing a reactive methyl group either in alpha position as e. g. quinaldine, 8-hydroxyquinaldine, methylbenzthiazole, or in gamma position as e. g. lepidine.

In D, the H atoms of the ring may evidently be substituted at will; two of them may also be suppressed by attachment e. g. of a benzene ring so as to form condensed nuclei.

Dyestuffs of the said general formula, e. g., 1-styrylisoquinoline of the general composition corresponding to the following formula

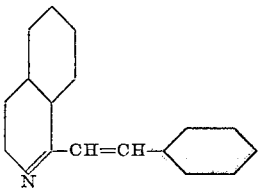

may be produced, as described in the German Patent No. 576,532, from the tautomeric forms of substituted phenylethylcinnamic acid amides by water splitting and eventually dehydrogenizing. The dyestuffs of the invention may comprise a part forming several =C=N— groups, this part being either of an open chain or a ring, or partly of an open chain and partly of a ring.

Some specific examples of the method of my invention are given hereinafter.

Example 1

A most suitable colored photographic layer was obtained by using a salt of dimethylaminobenzaldehydrothiotoluidine (described by E. Riesz and R. Hubsch in "Monatshefte" 53–54 (1929), 111–8).

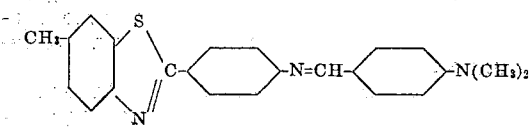

and of methylene disalicylic acid.

Example 2

A dyestuff was produced from dehydrothiotoluidine by means of alpha-naphthylamine (German Patent 69,265, ex. 1, lines 1–9). This dyestuff gives with methylene disalicylic acid a blue lacquer

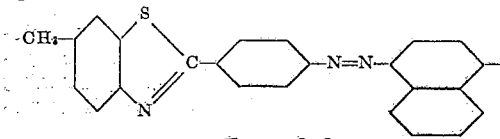

Example 3

A green lacquer was obtained from methylene disalicylic acid and the dyestuff

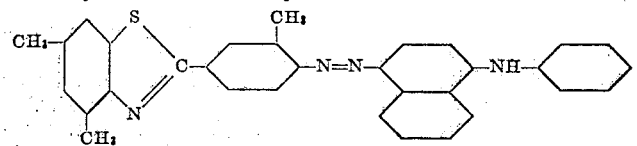

which resulted in an analogous manner as indicated in Example 2 from dehydrothio-m-xylidine and phenyl-alpha-naphthylamine.

Example 4

A purple-red lacquer was obtained by using methylene disalicylic acid and dimethylrosindole carboxylic acid (Beilstein 27, page 660, footnote)

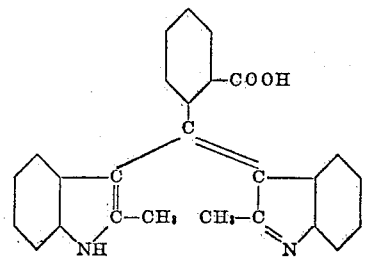

Example 5 p-Hydroxybenzalquinaldine ("Berichte 27," 1932) forms with organic acids intense yellow-colored lacquers

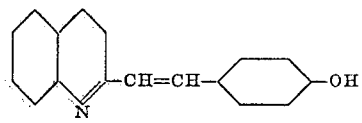

Example 6 p - Dimethylaminobenzalquinaldine - 6 - carboxylic acid described by Rupe, Hagenbach, Collin, Helv. 18 (1935), 1395

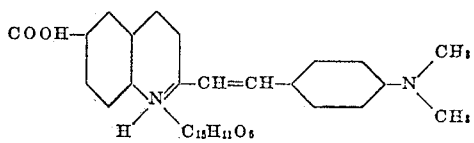

forms with methylene disalicylic acid an intense blue-violet lacquer.

Example 7

The condensation product of dimethylaminobenzaldehyde and ortho-nitro-quinaldine (described by F. Mathur and R. Robinson, Journal Chemical Soc. (1934), 1523)

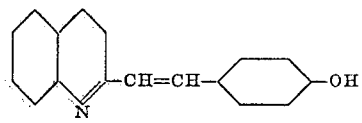

forms with methylene disalicylic acid a blue-green lacquer.

Example 8

The condensation product obtained in an analogous manner from lepidine (see Patent No. 2,313,922) gives violet lacquers

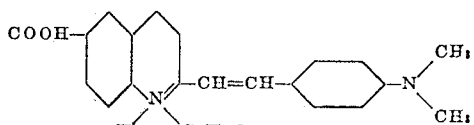

These dyestuffs are suitable for all photographic purposes where a layer discolorable in a weak alkaline medium is required as e. g. for filter layers, anti-halation layers, back layers and also for direct addition to the silver halide emulsion.

It is believed that the general method and the specific examples of my invention, as well as the advantages thereof, will be apparent from the foregoing detailed description. It will also be apparent that while I have shown and described preferred examples of my invention, changes may be made without departing from the spirit of the invention, as sought to be defined in the following claims.

I claim:

1. Photographic material containing at least one light-sensitive silver halide emulsion layer and a colored non-sensitive layer consisting of the salt of a basic dyestuff and methylene-disalicylic acid, the basic dyestuff containing a =C=N— group, which forms part of a heterocyclic ring, and corresponding to the following general formula:

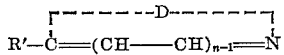

wherein R′ is a member selected from the group consisting of aromatic and heterocyclic radicals, D is the atom group required to complete a ring selected from the group consisting of 5 and 6-membered heterocyclic N-containing rings having a fused-on arylene group, and $n$ is a positive integer from 1 to 2.

2. Photographic material containing at least one light-sensitive silver halide emulsion layer and a colored non-sensitive layer consisting of the salt of dimethylaminobenzal dehydrothiotoluidine and methylene-disalicylic acid.

3. Photographic material containing at least one light-sensitive silver halide emulsion layer and a colored non-sensitive layer consisting of the salt of the dyestuff produced from dehydrothio-m-xylidine and phenyl-alpha-naphthylamine and methylene-disalicylic acid.

4. Photographic material containing at least one light-sensitive silver halide emulsion layer and a colored non-sensitive layer consisting of the salt of dimethylrosindole carboxylic acid and methylene-disalicylic acid.

5. Photographic material containing at least one light-sensitive silver halide emulsion layer and a colored non-sensitive layer consisting of the salt of p-hydroxybenzal-quinaldine and methylene-disalicylic acid.

6. Photographic material containing at least one light-sensitive silver halide emulsion layer and a colored non-sensitive layer consisting of a salt of a basic dyestuff and methylene-disalicylic acid, the basic dyestuff containing an azomethine group, which forms part of a heterocyclic ring, and corresponding to the general formula:

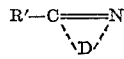

wherein R′ is a member selected from the group consisting of aromatic and heterocyclic radicals, and D is the atom group required to complete a 5 and 6-membered heterocyclic N-containing ring having a fused-on arylene group.

7. Photographic material containing at least one light-sensitive silver halide emulsion layer and a colored non-sensitive layer consisting of the salt of the dyestuff produced from dehydrothiotoluidine and alpha-naphthylamine and methylene-disalicylic acid.

8. Photographic material containing at least one light-sensitive silver halide emulsion layer and a colored non-sensitive layer consisting of the salt of p-dimethylaminobenzal-o-nitro-quinaldine and methylene-disalicylic acid.

9. Photographic material containing at least one light-sensitive silver halide emulsion layer and a colored non-sensitive layer consisting of the salt of p-dimethylaminobenzal-lepidine and methylene-disalicylic acid.

10. Photographic material containing at least one light-sensitive silver halide emulsion layer and a colored non-sensitive layer consisting of the salt of p-dimethylaminobenzal quinaldine-betacarboxylic acid and methylene-disalicylic acid.

11. Photographic light-sensitive silver halide material comprising at least one colored non-sensitive layer consisting of the salt of a basic azomethine dyestuff and methylene-disalicylic acid, the azomethine group of said dyestuff forming part of a heterocyclic ring, and said dyestuff corresponding to the following formula:

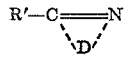

wherein R′ is a radical selected from the group consisting of aromatic and heterocyclic radicals, and D is the atom group required to complete a 5 and 6-membered heterocyclic N-containing ring having a fused-on arylene group.

JACOB JOSEPH JENNEN.

REFERENCES CITED

The following references are of record in the file of this patent:

UNITED STATES PATENTS

| Number | Name | Date |
|---|---|---|
| 256,444 | Pickhardt | Apr. 11, 1882 |
| 1,845,404 | Durr et al. | Feb. 16, 1932 |
| 1,879,537 | Schneider | Sept. 27, 1932 |
| 2,169,434 | Schwarz | Aug. 15, 1939 |
| 2,186,731 | Schneider | Jan. 9, 1940 |
| 2,282,890 | Schneider et al. | May 12, 1942 |
| 2,350,393 | Eistert | June 6, 1944 |
| 2,355,659 | Lee | Aug. 15, 1944 |
| 2,385,747 | Freyburg | Sept. 25, 1945 |

FOREIGN PATENTS

| Number | Country | Date |
|---|---|---|
| 126,346 | Switzerland | June 1, 1928 |